United States Patent
Park et al.

(10) Patent No.: US 10,292,095 B1
(45) Date of Patent: May 14, 2019

(54) SYSTEMS AND METHODS FOR DONOR ACCESS NODE SELECTION

(71) Applicant: Sprint Spectrum LP, Overland Park, KS (US)

(72) Inventors: Justin Sungki Park, Ashburn, VA (US); Brent Scott, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 105 days.

(21) Appl. No.: 15/458,260

(22) Filed: Mar. 14, 2017

(51) Int. Cl.
*H04W 48/20* (2009.01)
*H04B 7/024* (2017.01)
*H04B 17/318* (2015.01)
*H04B 17/336* (2015.01)
*H04W 88/08* (2009.01)

(52) U.S. Cl.
CPC ............ *H04W 48/20* (2013.01); *H04B 7/024* (2013.01); *H04B 17/318* (2015.01); *H04B 17/336* (2015.01); *H04W 88/08* (2013.01)

(58) Field of Classification Search
None
See application file for complete search history.

(56) References Cited

U.S. PATENT DOCUMENTS

| 8,355,367 | B2 | 1/2013 | Han et al. | |
|---|---|---|---|---|
| 9,119,107 | B2 | 8/2015 | Timus et al. | |
| 2009/0197603 | A1* | 8/2009 | Ji | H04W 36/0083 455/436 |
| 2012/0202503 | A1* | 8/2012 | Kitaji | H04B 7/155 455/438 |
| 2013/0172000 | A1 | 7/2013 | Van Phan et al. | |
| 2014/0295751 | A1* | 10/2014 | Miyata | H04W 16/26 455/7 |

* cited by examiner

*Primary Examiner* — Saba Tsegaye (57) ABSTRACT

Systems and methods are described for donor access node (DeNB) selection at a relay access node (AN). A plurality of DeNBs may be identified, the DeNBs being located within a radio range of the relay AN. A metric may be calculated at the relay AN and used by the relay AN to select multiple, preferred DeNBs from the plurality of DeNBs. The relay AN may simultaneously request a connection to each of the multiple, preferred DeNBs. Data signals may be combined for transport at the relay AN and sent to end-user wireless devices, the multiple, preferred DeNBs, or both.

20 Claims, 5 Drawing Sheets

SYSTEMS AND METHODS FOR DONOR ACCESS NODE SELECTION

TECHNICAL BACKGROUND

As wireless networks evolve and grow, there are ongoing challenges in providing high-quality service to increasing numbers of wireless devices operating in various coverage areas of a wireless network. One approach to improving Quality of Service (QoS) and coverage is to designate wireless device(s) as relay node(s) for relaying data between a Base Station (BS) or Donor Access Node (DeNB) and an end-user wireless device. Relay nodes may be used at the edge of a radio range (i.e., minimum usable signal area) of DeNBs to improve coverage and/or QoS, as well as in crowded areas having a high number of other wireless devices to increase the available throughput to the end-user wireless devices being relayed. But, relay nodes may be limited in their ability to effectively service end-user wireless devices that are attached to it, particularly when resources at the DeNB(s) are limited.

Overview

Systems and methods are described for DeNB selection at a relay Access Node (AN). For example, a plurality of candidate DeNBs may be identified at the relay AN; the relay AN being located within a radio range (i.e., minimum usable signal area) of each of the plurality of candidate DeNBs. Each of the candidate DeNBs are prioritized based on a calculated metric. A data session is established between the relay AN and a highest-prioritized DeNB. Alternatively, a metric may be calculated at the relay AN; the metric is used to select multiple preferred DeNBs from the plurality of DeNBs. The relay AN may simultaneously request a connect to each of the multiple, preferred DeNBs. At the relay AN, data signals for transport may be combined and sent to end-user wireless devices, the multiple, preferred DeNBs, or both.

In another embodiment, a relay AN supported by a first DeNB may be instructed to scan for second DeNBs; the relay AN being located within a radio range of each of the second DeNBs. A metric for prioritizing DeNBs from the second DeNBs may be calculated at the relay AN. The relay AN may establish a data session between the relay AN and the prioritized second DeNBs. Data signals received at the relay AN are combined and transmitted to the prioritized second DeNBs.

In another embodiment, a stationary relay AN may prioritize multiple DeNBs whose signal power, signal quality, or both is within a first range. At the relay AN, a metric for the prioritized DeNBs may be calculated. The relay AN may establish data sessions with each of the prioritized DeNBs. Data may be sent to end-user wireless devices, the prioritized DeNBs, or both via the relay AN using coordinated multipoint (CoMP).

DETAILED DESCRIPTION

As wireless networks develop, migration from voice-centralized services to data-centralized services (e.g., internet, applications, cloud-based services including video and other bandwidth-intensive content, etc.) continues to boost traffic at Access Nodes (ANs), which traffic has grown exponentially. The want for high Quality of Service (QoS) coupled with a shortage of wireless spectrum makes it challenging for network operators to meet multiple users' bandwidth and/or throughput demands simultaneously. One approach, in Heterogeneous Networks (HetNet), is to designate wireless devices as relay nodes for relaying data between Donor Access Nodes (DeNBs), and end-user wireless devices. For example, in operation, relay nodes can be used (or deployed) at the edge of a radio range (i.e., minimum usable signal area) of select DeNBs to improve coverage and/or QoS, as well as in crowded areas having a high number of other wireless devices (e.g., "hotspots") and/or coverage "holes" of the DeNBs to increase available throughput to end-user wireless devices being relayed.

Figure 1A:
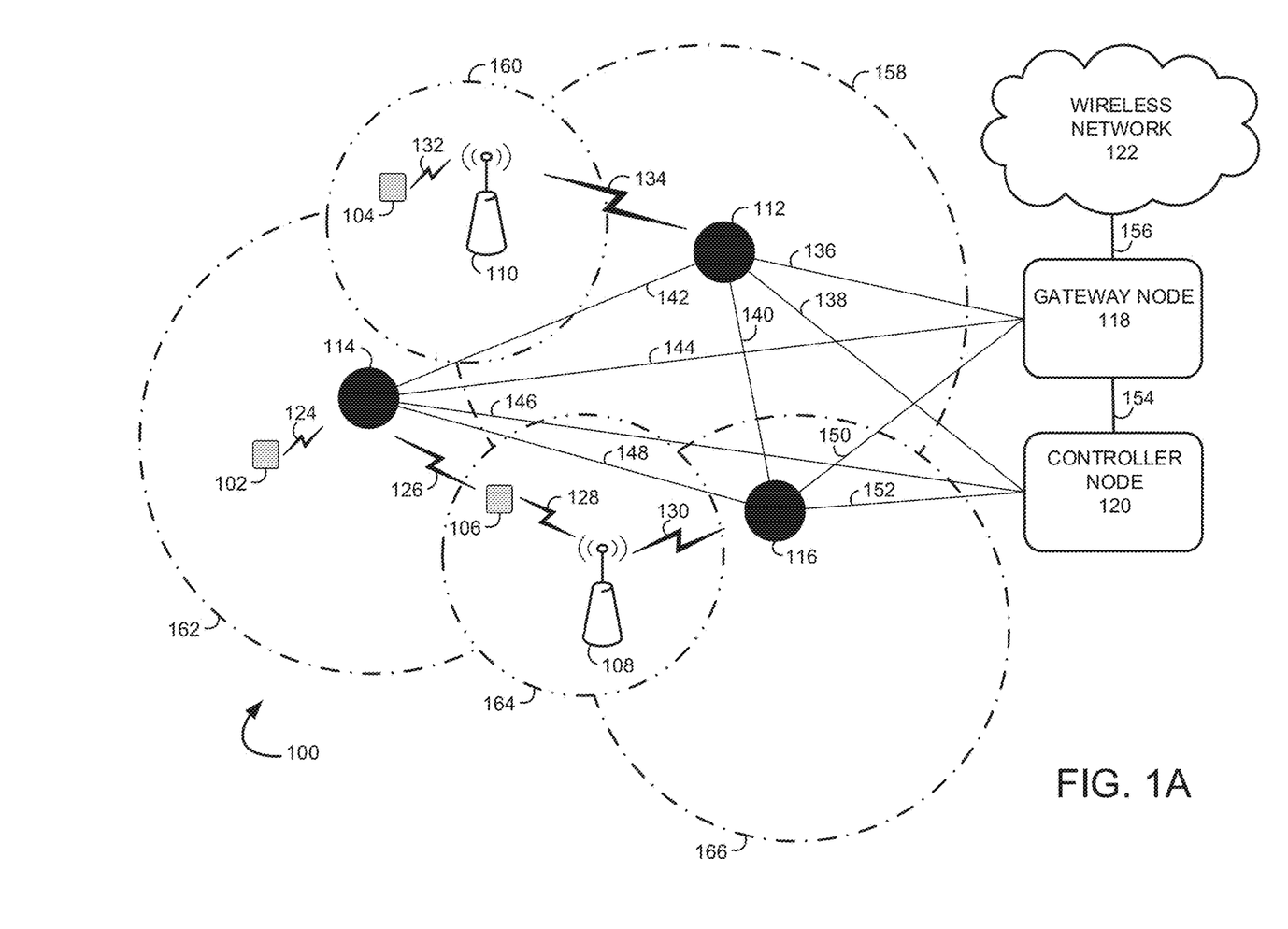
FIG. 1A illustrates an exemplary communication system for Donor Access Node (DeNB) selection.

Referring to FIG. 1A, relay nodes 108, 110 may be deployed within a radio range 158, 162, 166 of DeNBs 112, 114, 116 to increase capacity and/or coverage at cell-edges, "hotspots," and/or coverage "holes" of wireless network 122. DeNBs 112, 114, 116 can establish over-the-air links (or interfaces) 130, 134 with relay nodes 108, 110; In some embodiments, DeNBs 112, 114, 116 may establish direct backhaul links with relay nodes 108, 110. Once the over-the-air links (or direct backhaul links) 130, 134 have been established, the DeNBs 112, 114, 116 can instruct other wireless devices 102, 104, 106 (e.g., clustered wireless devices, relay/non-relay capable wireless devices, mini-macros, etc.) operating in a radio range 160, 164 of the designated (or deployed) relay nodes 108, 110 and/or DeNBs 112, 114, 116 to establish radio access links (or interfaces) 128, 132 with relay nodes 108, 110.

Relay nodes are classified based on the number of protocol layers being implemented. For example, relay nodes 108, 110 can be configured (or classified) as Amplify-and-Forward (AF), Decode-and-Forward (DF), and/or Layer 3 relays, or can be configured to function as a mini-macro (i.e., a low-power AN).

AF relays are Layer 1 (L1) relay nodes and may be configured as full-duplex "boosters" or "repeaters" (e.g., which repeat by amplifying and re-transmitting signals on, for example, a Physical (PHY) Layer of the Open Systems Interconnection (OSI) Model). Because L1 relays amplify and re-transmit without decoding (i.e., amplification is carried out on a distorted signal) negative effects of, for example, radio hop, are also amplified, which may deteriorate and/or constrain Signal-to-Interference-Plus-Noise (SINR) levels and/or network throughput. In addition, high processing time at DeNBs can result in Inter-Symbol Interference (ISI) at relay nodes and/or for end-user wireless devices. But, because L1 relays are mostly transparent, and have negligible relaying delays, L1 relays can be used successfully in simple coverage extension scenarios. For example, L1 relays can be deployed to improve coverage in mountainous regions, sparsely populated and urban areas, and in indoor environments.

DF relays are Layer 2 (L2) relay nodes. L2 relays de-modulate and de-code RF signals (or other signals) from DeNBs (e.g., received at the L2 relay on the DL) and then re-encode and re-modulate the signals before transmitting the re-encoded and re-modulated signals to end-user wireless devices. Because L2 relays perform de-modulation and de-coding processing, L2 relays overcome drawback(s) related to deteriorated SINR (e.g., resultant from amplification on distorted signals) often characteristic of L1 relays. L2 relays are also configured to incorporate the functionalities of, for example, a Medium Access Control (MAC) Layer of the OSI Model and can function as DeNBs, lacking only a fixed connection (i.e., wired backhaul links) to the operator's core network; In other words, L2 relays are self-backhauling. L2 relays perform full signal reception and/or re-transmit procedures (e.g., up to, for example, a Transmission Control Protocol (TCP) Layer of the OSI Model) and use signal processing (as noted above) to decode and then re-generate useful signals including: error correction, re-modulation, and re-encoding. In some circumstances, due to signal processing delays and/or system complexity (e.g., caused by modulation/de-modulation and/or encoding/re-encoding of signals, etc.), use of L2 relays may degrade QoS for certain delay-sensitive traffic such as Voice-Over-IP (VoIP).

L3 relay nodes also perform de-modulation and de-coding of RF signals (or other signals) sent to/from DeNBs on the UL and/or DL. Unlike L2 relays, L3 relays include full Radio Resource Control (RRC) capabilities and include all of the protocol functionalities of DeNBs. For example, L3 relays can communicate with DeNBs through an x2-like interface (e.g., similar to links 130, 134, 134A, 134B, 13C illustrated in FIGS. 1A and 1B) or, when not configured as a relay node, with DeNBs over a radio access link (e.g., similar to links 124, 126, 128, 132 illustrated in FIG. 1A). L3 relays can implement Packet Data Convergence Protocols (PDCP), Service Data Units (SDUs), etc., such that data packets at, for example, an Internet Protocol (IP) Layer of the OSI Model, are viewable at the relay node(s). L3 relays perform de-modulation and de-coding of Radio Frequency (RF) signals (or other signals), process data (e.g., by ciphering, combining/dividing, encoding, modulating, etc.), and re-transmit data to, for example, end-user wireless devices. L3 relays may be assigned a unique Physical Cell Identity (PCI) via, for example, the PHY Layer or other layer of the OSI Model, which PCI is different from a PCI assigned to the DeNB(s).

Relay nodes can also be configured (or classified) based on a network resource usage strategy on (or for) the over-the-air and/or radio access links (or interfaces). For example, wireless network 122 and/or system 100 can configure (or classify) relay nodes' use of spectrum as In-Band and/or Out-Band relaying. Data packets can be uploaded/downloaded on UL and/or DL portions of the over-the-air links and/or radio access links via sub-layers of, for example, a User Plane (UP) protocol stack of the OSI Model. For In-Band relaying, the over-the-air links and/or radio access links are operated on the same frequency carrier and, to avoid self-interference, are time-multiplexed through re-use of Multimedia-Broadcast-Over-Single-Frequency-Network (MBSFN) subframes. For Out-Band relaying, the over-the-air links and/or radio access links are operated on different carrier frequencies/spectrum to improve network capacity.

Figure 1B:
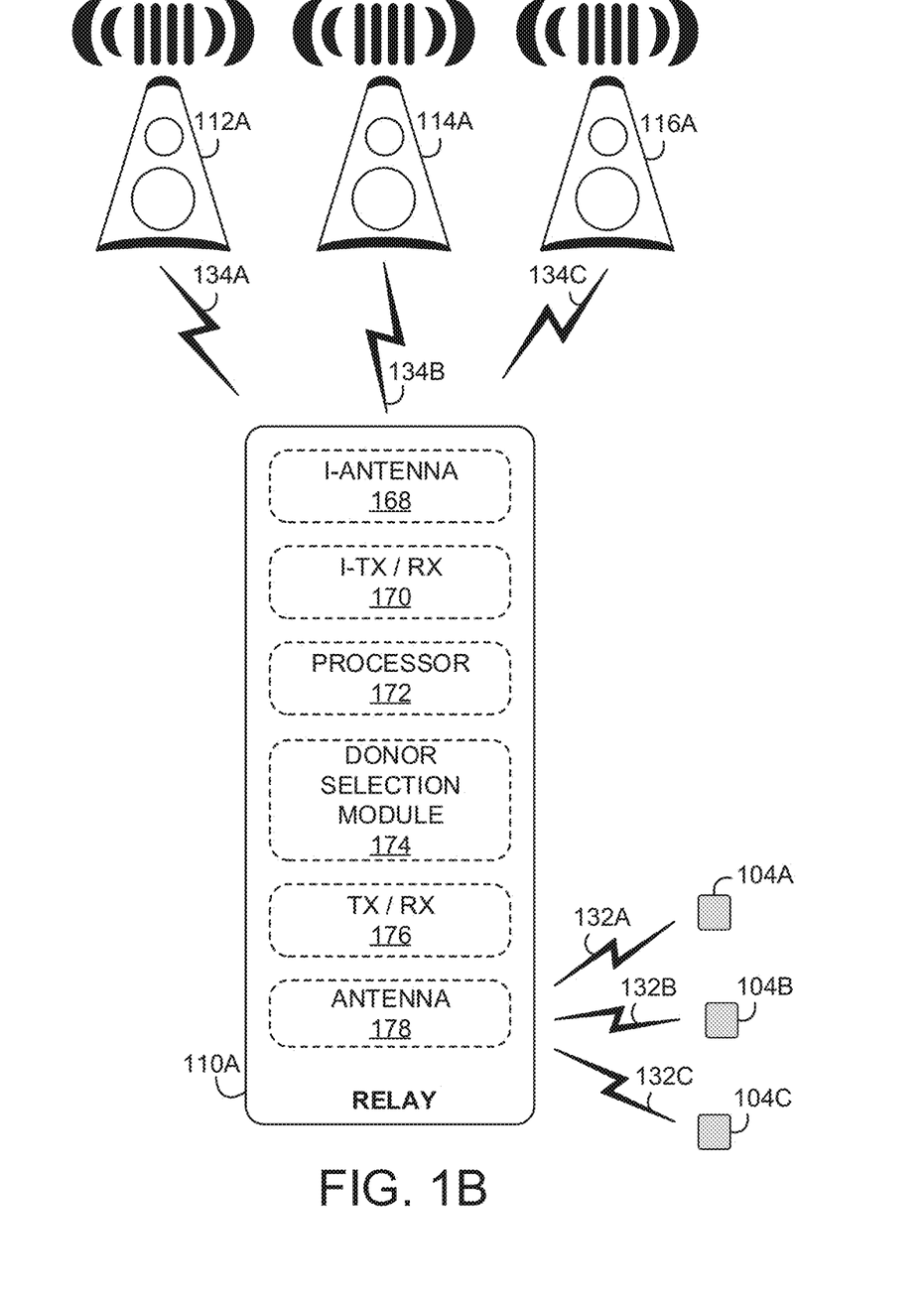
FIG. 1B illustrates an exemplary iRelay Access Node (AN) of the exemplary communication system illustrated in FIG. 1A.

Referring to FIGS. 1A and 1B, in operation, relay nodes 108, 110 and/or end-user wireless devices (e.g., of DeNBs 112, 114, 116 and/or relay nodes 108, 110) operating within a radio range 158, 160, 162, 164, 166 of DeNBs 112, 114, 116 and/or relay nodes 108, 110 may continue to experience reduced channel capacity, for example, low SINR, QoS degradation, etc., caused by a limited backhaul capacity of DeNBs 112, 114, 116. In an exemplary embodiment, illustrated in FIG. 1B, system 100 (or wireless network 122) can dedicate power supply at stationary (or mobile) iRelay node 110A (or at relay nodes 108, 110) and can configure (or activate) high profile, directional antennas (iAntenna) 168 deployed at iRelay node 110A to scan for DeNBs 112A, 114A, 116A within a radio range 160 (illustrated in FIG. 1A) of iRelay node 110A.

For example, in one embodiment, DeNBs 112A, 114A, 116A establish over-the-air backhaul links (or interfaces) 134A, 134B, 134C with iRelay node 110A; After establishing the over-the-air backhaul links 134A, 134B, 134C, DeNBs 112A, 114A, 116A and/or iRelay node 110A can instruct other wireless devices 104A, 104B, 104C operating in the radio range 160 of iRelay node 110A to establish over-the-air links 132A, 132B, 132C and/or radio access links 132 (illustrated in FIG. 1A) with iRelay node 110A (e.g., based on a network resource usage strategy) using antenna 178. Once the over-the-air links 132A, 132B, 132C with end-user wireless devices 104A, 104B, 104C are established, iRelay node 110A can send and/or receive data packets to/from end-user wireless devices 104A, 104B, 104C using transmit/receive (Tx/Rx) antennas 176 deployed at the iRelay node 110A. The Tx/Rx antennas 176 are (or can be) configured as smart antennas capable of performing Carrier Aggregation (CA), Beamforming, Multiple-Input-Multiple-Output (MIMO) techniques, Coordinated Multi-point (CoMP), etc. Because iRelay node 110A includes greater computational and/or RF capabilities than relay nodes 108, 110 and/or end-user wireless device 104A, 104B, 104C, iRelay node 110A can sustain and use the established over-the-air backhaul links (or direct backhaul links) 134A, 134B, 134C to DeNBs 112A, 114A, 116A as backhaul for end-user wireless devices 104A, 104B, 104C by, for example, tunneling data traffic (or packets) originating at end-user wireless devices 104A, 104B, 104C and/or at iRelay node 110A over (or through) one or more over-the-air backhaul links 134A, 134B, 134C established with DeNBs 112A, 114A, 116A on the UL to wireless network 112 using a protocol such as a Generic Tunneling Protocol (GTP).

In some instances, iRelay node 110A may desire a more robust backhaul connection for relaying data traffic (or packets) to/from end-user wireless devices 104A, 104B, 104C. iRelay node 110A may select one or more DeNBs 112A, 114A, 116A to establish an RRC Connection (and over-the-air backhaul link) with for relaying data traffic based on one or more signal conditions of candidate DeNBs 112A, 114A, 116A measured at iRelay node 110A. For example, DeNBs 112A, 114A, 116A and/or iRelay node 110A (via system 100 and/or wireless network 122) can enable (or turn on) iAntenna 168 at iRelay node 110A such that iRelay node 110A operates in iMode.

In iMode, iRelay node 110A can steer iAntenna 168 to scan for DeNBs 112A, 114A, 116A with a broadcast signal condition (or level) that meets a criteria (or falls within a set signal range); For DeNBs 112A, 114A, 116A whose broadcast signal condition meets the criteria, iRelay node 110A can simultaneously (or otherwise) establish (or set up) RRC Connections with those DeNBs 112A, 114A, 116A, which DeNBs 112A, 114A, 116A form a pool of candidate DeNBs 112A, 114A, 116A. The criteria for the broadcast signal conditions of candidate DeNBs 112A, 114A, 116A can include a preference or requirement for DeNBs 112A, 114A, 116A, such as a minimum available throughput (e.g., based on a number of end-user wireless devices 102, 104, 104A, 104B, 104C, 106 that are attaching to or expected to be attached to iRelay node 110A and/or DeNBs 112A, 114A, 116A), a frequency band, a CA ability, Beamforming ability, MIMO ability, CoMP ability, etc. The criteria for the broadcast signal level of candidate DeNBs 112A, 114A, 116A can include a signal strength, a signal quality, and/or other signal level measurement. A signal strength can include a Signal-to-Noise Ratio (SNR), a Signal-to-Interference Ratio (SIR), an SINR, a Carrier-to-Interference-Plus-Noise Ratio (CINR), a Received-Signal-Strength-Indicator (RSSI), a Reference-Signal-Received-Power (RSRP), and the like. A signal quality can include a Channel Quality Indicator (CQI), a Reference-Signal-Receive-Quality (RSRQ), and the like.

As noted above, iRelay node 110A can use the established RRC Connections with DeNBs 112A, 114A, 116A to collect CQI data (or other information) reported by DeNBs 112A, 114A, 116A (e.g., in broadcast signals) at iTransmit and/or iReceive (iTx/Rx) antennas 170 deployed at iRelay node 110A using RRC signaling between iRelay node 110A and DeNBs 112A, 114A, 116A. iRelay node 110A can use the collected CQI data to determine (or calculate) a Modulation and Coding Scheme (MCS) value for over-the-air backhaul links 134A, 134B, 134C, which connect iRelay node 110A to DeNBs 112A, 114A, 116A. Combined with the MCS, CQI can be converted into an expected throughput (or other congestion value) for over-the-air backhaul links 134A, 134B, 134C. DeNBs 112A, 114A, 116A and/or iRelay node 110A may use the expected throughput calculation to estimate a number (or other quantity) of Physical Resource Blocks (PRBs) available at each DeNB 112A, 114A, 116A for allocation (or dedication) as backhaul PRBs to iRelay node 110A. In addition, iRelay node 110A may use the expected throughput to estimate an average PRB usage for DeNBs 112A, 114A, 116A and/or an average PRB usage for the pool of candidate DeNBs 112A, 114A, 116A.

iRelay node 110A can use data reported by DeNBs 112A, 114A, 116A in broadcast signals to calculate a metric f, which metric f is used to prioritize DeNBs 112A, 114A, 116A in the pool of candidate DeNBs 112A, 114A, 116A. In one embodiment, the metric f can be calculated using broadcast signals and PRB usage associated with DeNBs 112A, 114A, 116A operating within a radio range 160 of iRelay node 110A. For example, iRelay node 110A (operating in iMode) can steer iAntenna 168 to scan for DeNBs 112A, 114A, 116A with an RSRP broadcast signal level within a set range of RSRP broadcast signal level values; iRelay node 110A can simultaneously (or otherwise) establish an RRC Connection with DeNBs 112A, 114A, 116A having an RSRP broadcast signal level within the set range. iRelay node 110A can use the RRC Connections to collect data from DeNBs 112A, 114A, 116A; the collected data (e.g., reported CQI, MCS, etc.) is used to determine (or calculate) an expected throughput for over-the-air backhaul links 134A, 134B, 134C. Based on the expected throughput, iRelay node 110A can estimate a number (or other quantity) of PRBs available at each DeNB 112A, 114A, 116A for dedication as backhaul PRBs to iRelay node 110A, which is used to calculate a metric f for each DeNB 112A, 114A, 116A in the pool of candidate DeNBs 112A, 114A, 116A. For example, the calculated metric f can be a ratio of RSRP to AveragePRB. In one embodiment, the RSRP to AveragePRB for DeNB 112A can be −90/50%, where AveragePRB is available PRBs for iRelay node 110A backhaul at DeNB 112A. Similarly, the RSRP to AveragePRB for DeNB 114A can be −90/10%, where AveragePRB is available PRBs for iRelay node 110A backhaul at DeNB 114A. Because −90/50% is greater than −90/10%, iRelay node 110A may prioritize DeNB 112A over DeNB 114A for establishing a data session (e.g., using iTx/Rx antenna 170, iAntenna 168, and/or over-the-air backhaul link 134A).

In another embodiment, for example, iRelay node 110A (operating in iMode) can steer iAntenna 168 to scan for DeNBs 112A, 114A, 116A with RSRP and RSRQ broadcast signal levels within a set range of RSRP and RSRQ broadcast signal level values; iRelay node 110A can simultaneously (or otherwise) establish an RRC Connection with DeNBs 112A, 114A, 116A having RSRP and RSRQ broadcast signal levels within the set range. The RSRP and RSRQ broadcast signal levels of DeNBs 112A, 114A, 116A can be used to calculate a new Reference Signal ($RS_n$), the new reference signal $RS_n$ being assigned to specific Resource Elements (REs) allocated for iRelay node 110A. As noted above, iRelay node 110A can use the RRC Connections to collect data from DeNBs 112A, 114A, 116A; the collected data (e.g., reported CQI, MCS, etc.) is used to determine (or calculate) an expected throughput for over-the-air backhaul links 134A, 134B, 134C. Based on the expected throughput, iRelay node 110A can estimate a number (or other quantity) of PRBs available at each DeNB 112A, 114A, 116A for dedication as backhaul PRBs to iRelay node 110A, which is used to calculate a metric f for each DeNB 112A, 114A, 116A in the pool of candidate DeNBs 112A, 114A, 116A. For example, the calculated metric f can be a ratio of $RS_n$ to AveragePRB. In one embodiment, the $RS_n$ to AveragePRB for DeNB 112A can be −90/50%, where AveragePRB is available PRBs for iRelay node 110A backhaul at DeNB 112A. Similarly, the $RS_n$ to AveragePRB for DeNB 114A can be −90/10%, where AveragePRB is available PRBs for iRelay node 110A backhaul at DeNB 114A. Because −90/50% is greater than −90/10%, iRelay node 110A may prioritize DeNB 112A over DeNB 114A for establishing a data session (e.g., using iTx/Rx antenna 170, iAntenna 168, and/or over-the-air backhaul link 134A).

Alternatively, iRelay 110A can calculate a metric f for DeNBs 112A, 114A, 116A in the pool of candidate DeNBs 112A, 114A, 116A and use the calculated metric f to select multiple, preferred DeNBs from the pool of candidate DeNBs 112A, 114A, 116A. For example, iRelay node 110A (operating in iMode) can steer iAntenna 168 to scan for DeNBs 112A, 114A, 116A with RSRP and/or RSRQ broadcast signal levels within a set range of RSRP and/or RSRQ broadcast signal level values; iRelay node 110A can simultaneously (or otherwise) establish an RRC Connection with DeNBs 112A, 114A, 116A having RSRP and/or RSRQ broadcast signal levels within the set range. As noted above, iRelay node 110A can use the RRC Connections to collect data from DeNBs 112A, 114A, 116A; the collected data (e.g., reported CQI, MCS, etc.) is used to determine (or calculate) an expected throughput for over-the-air backhaul links 134A, 134B, 134C. Based on the expected throughput, iRelay node 110A can estimate a number (or other quantity) of PRBs available at each DeNB 112A, 114A, 116A for dedication as backhaul PRBs to iRelay node 110A, which is used to calculate a metric f for each DeNB 112A, 114A, 116A in the pool of candidate DeNBs 112A, 114A, 116A. The calculated metric f can be either a ratio of RSRP to AveragePRB and/or a ratio of $RS_n$ to AveragePRB. iRelay node 110A may select (or prefer) multiple DeNBs 112A, 114A, 116A over other DeNBs 112A, 114A, 116A based on the calculated metric f. For example, in one embodiment, the RSRP/AveragePRB or $RS_n$/AveragePRB for DeNB 112A can be −90/50%, where AveragePRB is a sum of available PRBs for iRelay node 110A backhaul across all selected DeNBs. Similarly, the RSRP/AveragePRB or $RS_n$/AveragePRB for DeNB 114A can be −90/30%, where AveragePRB is a sum of available PRBs for iRelay node 110A backhaul across all selected DeNBs. Finally, the RSRP/AveragePRB or $RS_n$/AveragePRB for DeNB 116A can be −90/10%, where AveragePRB is a sum of available PRBs for iRelay node 110A backhaul across all selected DeNBs. Because −90/50% and −90/30% are both greater than −90/10%, iRelay node 110A may select (or prefer) DeNBs 112A and 114A over DeNB 116A for establishing a data session (e.g., using iTx/Rx antenna 170, iAntenna 168, and/or over-the-air backhaul links 134A, 134B).

FIG. 1A illustrates an exemplary communication system 100 for DeNB selection in a wireless network. FIG. 1B illustrates an exemplary iRelay node of the communication system 100 illustrated in FIG. 1A. System 100 can comprise end-user wireless devices 102, 104, 104A, 104B, 104C, 106, iRelay (or relay) nodes 108, 110, 110A, DeNBs (or access nodes) 112, 112A, 114, 114A, 116, 116A, controller node 120, gateway node 118, and wireless network 122. DeNBs 112, 112A, 114, 114A, 116, 116A and/or iRelay nodes 108, 110, 110A may include an inspection module (not shown). Alternatively, an inspection node (not shown) may be in the backhaul of system 100. The communications between end-user wireless devices 102, 104, 104A, 104B, 104C, 106 and iRelay nodes 108, 110, 110A and/or DeNBs 112, 112A, 114, 114A, 116, 116A may be relayed, monitored, and/or inspected by the inspection module and/or inspection node.

Other network elements may be present in the communication system 100 to facilitate communication but are omitted for clarity, such as base stations, base station controllers, gateways, Mobile-Switching Centers (MSC), Dispatch Application Processors (DAP), and location registers such a Home Location Register (HLR) or Visitor Location Register (VLR). Furthermore, other network elements may be present to facilitate communication between DeNBs 112, 112A, 114, 114A, 116, 116A and/or iRelay nodes 108, 110, 110A and wireless network 122, which are omitted for clarity, including additional processing nodes, routers, gateways, and physical and/or wireless data links for carrying data among the various network elements.

End-user wireless devices 102, 104, 104A, 104B, 104C, 106 and/or iRelay nodes 108, 110, 110A can be any device configured to communicate over system 100 using a wireless interface. For example, wireless devices 102, 104, 104A, 104B, 104C, 106 and/or iRelay nodes 108, 110, 110A can include a remote terminal unit, a cell phone, a smart phone, a computing platform such as a laptop, palmtop, or a tablet, a Personal Digital Assistant (PDA), or an internet access device, and combinations thereof. Wireless devices 102, 104, 104A, 104B, 104C, 106 and/or iRelay nodes 108, 110, 110A can include one or more transceivers for transmitting and receiving data over system 100. Each transceiver can be associated with the same or different frequency bands, the same or different radio access technologies, the same or different network providers, and/or the same or different services. For example, wireless devices 102, 104, 104A, 104B, 104C, 106 and/or iRelay nodes 108, 110, 110A can include Tx/Rx antennas (e.g., Tx/Rx antenna 176, iTx/Rx antenna 168, etc.) that are associated with one or more of the following: Code Division Multiple Access (CDMA) 1×RTT, Global System for Mobile communications (GSM), Worldwide Interoperability for Microwave Access (WiMAX), Third Generation Partnership Project Long Term Evolution (3GPP LTE), High-Speed Packet Access (HSPA), IEEE 802.11, WiFi, Bluetooth, Zigbee, IrDA, Multimedia Broadcast Multicast Service (MBMS), etc.

Wireless devices 102, 104, 104A, 104B, 104C, 106 and/or iRelay nodes 108, 110, 110A can be connected with DeNBs 112, 112A, 114, 114A, 116, 116A and/or iRelay nodes 108, 110, 110A through communication links 124, 126, 128, 130, 132, 132A, 132B, 132C, 134. Links 124, 126, 128, 130, 132, 132A, 132B, 132C, 134 can use various communication media, such as air, space, metal, optical fiber, or some other signal propagation path—including combinations thereof. Links 124, 126, 128, 130, 132, 132A, 132B, 132C, 134 may comprise many different signals sharing the same link. Links 124, 126, 128, 130, 132, 132A, 132B, 132C, 134 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless devices 102, 104, 104A, 104B, 104C, 106 and/or iRelay nodes 108, 110, 110A and DeNBs 112, 112A, 114, 114A, 116, 116A and/or iRelay nodes 108, 110, 110A could share the same representative wireless link, but be transferred over different communication sessions, frequencies, timeslots, packets, ports, sockets, logical transport links, or in different directions—including combinations thereof.

Wireless devices 102, 104, 104A, 104B, 104C, 106 and/or iRelay nodes 108, 110, 110A can transmit and/or receive information over system 100 using various communication services. These services can include various voice, data, and/or MBMS services and applications. For example, mobile voice services, mobile data services, PTT services, internet services, web browsing, email, pictures, picture messaging, video, video messaging, broadcast video, audio, voicemail, music, MP3's, ring tones, stock tickers, new alerts, etc.

DeNBs 112, 112A, 114, 114A, 116, 116A and/or iRelay nodes 108, 110, 110A can be any network node configured to provide communication between wireless devices 102, 104, 104A, 104B, 104C, 106 and/or iRelay nodes 108, 110, 110A and wireless network 122. DeNBs 112, 112A, 114, 114A, 116, 116A and/or iRelay nodes 108, 110, 110A can be short-range ANs or standard ANs. A short-range AN could include a microcell base station, a picocell base station, a femtocell base station, a Remote Radio Head (RRH), relay node, iRelay node, or other low-power AN; a standard AN (i.e., a high-power AN) could include a base transceiver station, a radio base station, an eNodeB device, or an enhanced eNodeB device, a DeNB or the like. DeNBs 112, 112A, 114, 114A, 116, 116A and/or iRelay nodes 108, 110, 110A may communicate scheduling decisions (e.g., DL scheduling assignments) to wireless devices 102, 104, 104A, 104B, 104C, 106 and/or iRelay nodes 108, 110, 110A using Downlink Control Information (DCI) carried by a Downlink Control Channel (PDCCH). The DCI DL scheduling assignments may include, for example, Physical Downlink Shared Channel (PDSCH), resource indication, a transport format, hybrid-ARQ information, control information (e.g., related to multiplexing), command for power control of the Physical Uplink Control Channel (PUCCH), uplink scheduling grants, Physical Downlink Shared Channel (PUSCH) resource indication, transport format (e.g., an index of MCS, which may be QPSK, QAM16, QAM64, etc.), etc. DeNBs 112, 112A, 114, 114A, 116, 116A and/or iRelay nodes 108, 110, 110A may further include, for example: a higher MAC stack module configured to schedule wireless devices 102, 104, 104A, 104B, 104C, 106 and/or iRelay nodes 108, 110, 110A based on CSI sent to DeNBs 112, 112A, 114, 114A, 116, 116A and/or iRelay nodes 108, 110, 110A from wireless devices 102, 104, 104A, 104B, 104C, 106 and/or iRelay nodes 108, 110, 110A; a lower MAC stack module configured to perform data handling functions (e.g., multiplexing, de-multiplexing, modulation, and/or de-modulation) of the transmit signals sent to DeNBs 112, 112A, 114, 114A, 116, 116A and/or iRelay nodes 108, 110, 110A from wireless devices 102, 104, 104A, 104B, 104C, 106 and/or iRelay nodes 108, 110, 110A; and, pre-coding stack module configured to transmit the multiple transmit signals from DeNBs 112, 112A, 114, 114A, 116, 116A and/or iRelay nodes 108, 110, 110A to wireless devices 102, 104, 104A, 104B, 104C, 106 and/or iRelay (or relay) nodes 108, 110, 110A based on a pre-coding weight calculated using Pre-Coding Matrix Information (PMI). In an exemplary embodiment, iRelay nodes 108, 110, 110A can use PMI to steer iAntenna 168 toward DeNBs 112A, 114A, 116A; iRelay nodes 108, 110, 110A can also use a DL sounding channel to steer iAntenna 168 toward DeNBs 112A, 114A, 116A. It is noted that while nine DeNBs 112, 112A, 114, 114A, 116, 116A and/or iRelay nodes 108, 110, 110A are illustrated in FIGS. 1A and 1B, any number of ANs can be implemented within system 100.

DeNBs 112, 112A, 114, 114A, 116, 116A and/or iRelay nodes 108, 110, 110A can comprise a processor and associated circuitry to execute or direct the execution of computer-readable instructions to obtain information including, for example, processor 172 and/or donor selection module 174 (illustrated in FIG. 1B). DeNBs 112, 112A, 114, 114A, 116, 116A and/or iRelay nodes 108, 110, 110A can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. DeNBs 112, 112A, 114, 114A, 116, 116A and/or iRelay nodes 108, 110, 110A can receive instructions and other input at a user interface.

Gateway node 118 can be any network node configured to interface with other network nodes using various protocols. Gateway node 118 can communicate user data over system 100. Gateway node 118 can be a standalone computing device, computing system, or network component, and can be accessible, for example, by a wired or wireless connection, or through an indirect connection such as through a computer network or cellular network. For example, gateway node 118 can include a Serving Gateway (SGW) and/or a Public Data Network Gateway (PGW), etc. One of ordinary skill in the art would recognize that gateway node 118 is not limited to any specific technology architecture, such as LTE and can be used with any network architecture and/or protocol.

Gateway node 118 can comprise a processor and associated circuitry to execute or direct the execution of computer-readable instructions to obtain information. Gateway node 118 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 118 can receive instructions and other input at a user interface.

Controller node 120 can be any network node configured to communicate information and/or control information over system 100. Controller node 120 can be configured to transmit control information associated with a handover procedure. Controller node 120 can be a standalone computing device, computing system, or network component, and can be accessible, for example, by a wired or wireless connection, or through an indirect connection such as through a computer network or cellular network. For example, controller node 120 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that controller node 120 is not limited to any specific technology architecture, such as LTE and can be used with any network architecture and/or protocol.

Controller node 120 can comprise a processor and associated circuitry to execute or direct the execution of computer-readable instructions to obtain information. Controller node 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 120 can receive instructions and other input at a user interface.

DeNB 112, 112A may be connected with gateway node 118 through communication link 136 and with controller node 120 through communication link 138. DeNB 112, 112A may be connected with DeNB 114, 114A through communication link 142. DeNB 114, 114A may be connected with gateway node 118 through communication link 144 and with controller node 120 through communication link 146. DeNB 114, 114A may be connected with DeNB 116, 116A through communication link 148. DeNB 116, 116A may be connected with gateway node 118 through communication link 150 and with controller node 120 through communication link 152. DeNB 116, 116A may be connected with DeNB 112, 112A through communication link 140. Gateway node 118 may be connected with controller node 120 through communication link 154 and with wireless network 122 through communication link 156. Links 136, 138, 140, 142, 144, 146, 148, 150, 152, 154, 156 can be wired or wireless and use various communication protocols such as Internet, Internet Protocol (IP), Local Area Network (LAN), optical networking, Hybrid Fiber Coax (HFC), telephony, T1, or some other communication format—including combinations, improvements, or variations thereof. Links 136, 138, 140, 142, 144, 146, 148, 150, 152, 154, 156 can be a Radio Frequency (RF), microwave, infrared, or other similar signal, and can use a suitable communication protocol, for example, GSM, CDMA, WiMAX, or LTE, or combinations thereof. Other wireless protocols can also be used. Links 136, 138, 140, 142, 144, 146, 148, 150, 152, 154, 156 can be a direct link or might include various equipment, intermediate components, systems, and networks. The communications between wireless devices 102, 104, 104A, 104B, 104C, 106 and/or iRelay nodes 108, 110, 110A and DeNBs 112, 112A, 114, 114A, 116, 116A or iRelay nodes 108, 110, 110A and wireless network 122 may be relayed, monitored, and/or inspected by an inspection module at DeNBs 112, 112A, 114, 114A, 116, 116A and/or iRelay nodes 108, 110, 110A and/or an inspection node.

Wireless network 122 can be a wired and/or wireless communication network, and can comprise processing nodes, routers, gateways, and physical and/or wireless data links for carrying data among various network elements, including combinations thereof, and can include a LAN or Wide Area Network (WAN), and an internetwork (including the Internet). Wireless network 122 can be capable of carrying data, for example, to support voice, PTT, broadcast video, and data communications by a wireless device and/or relay node, such as wireless devices 102, 104, 104A, 104B, 104C, 106 and/or iRelay nodes 108, 110, 110A. Wireless network protocols can comprise MBMS, CDMA 1×RTT, GSM, UMTS, HSPA, EV-DO, EV-DO rev. A, 3GPP LTE, and WiMAX. Wired network protocols that may be utilized by wireless network 122 comprise Ethernet, Fast Ethernet, Gigabit Ethernet, Local Talk (such as Carrier Sense Multiple Access with Collision Avoidance), Token Ring, FDDI, ATM. Wireless network 122 can also comprise additional base stations, controller nodes, telephony switches, internet routers, network gateways, computer systems, communication links, or some other type of communication equipment, and combinations thereof.

Figure 2:
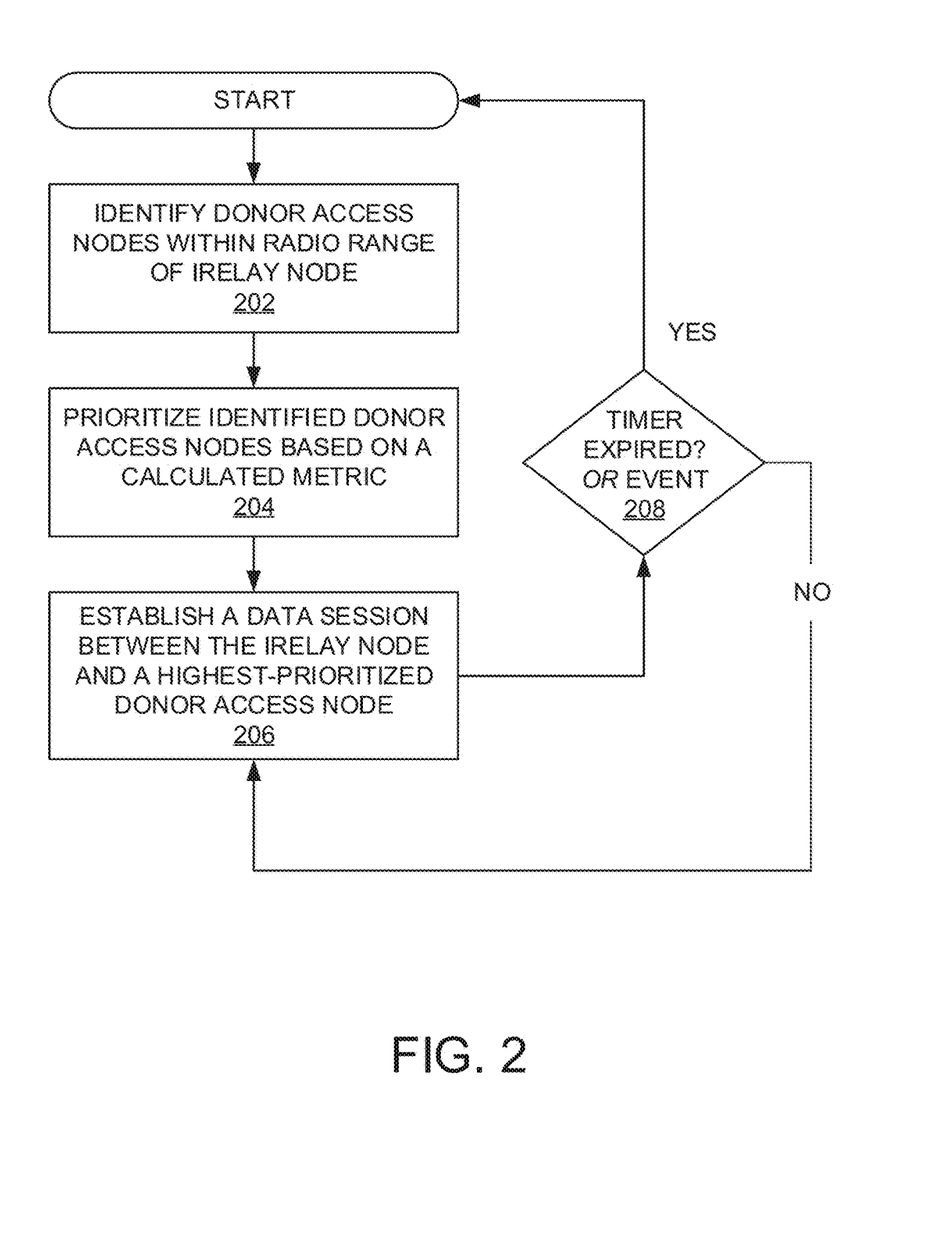
FIG. 2 illustrates a flow chart of an exemplary method for DeNB selection.

FIG. 2 illustrates a flow chart of an exemplary method for DeNB selection. The method will be discussed with reference to the exemplary system 100 illustrated in FIG. 1A and the exemplary iRelay AN illustrated in FIG. 1B. But, the method for DeNB selection illustrated in FIG. 2 can be implemented with any suitable communication system. In addition, although FIG. 2 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

In some instances, relay nodes 108, 110 can continue to experience reduced channel capacity (e.g., low SINR, QoS degradation, etc.) and/or unreliable connections with DeNBs 112, 114, 116 caused by a limited backhaul capacity at the DeNBs 112, 114, 116. Deployment of stationary (or mobile) iRelay nodes 110A, which are self-backhauling relays, creates additional opportunities for increased channel capacity at cell-edges, "hotspots," and/or at coverage "holes" of wireless network 122 for end-user wireless devices 104A, 104B, 104C being relayed. Because iRelay node 110A includes greater computational and/or RF capabilities than relay nodes 108, 110 and/or end-user wireless devices 104A, 104B, 104C, iRelay node 110A can sustain and use established over-the-air backhaul links 134A, 134B, 134C to DeNBs 112A, 114A, 116A to create a more robust backhaul for end-user wireless devices 104A, 104B, 104C by, for example, tunneling data traffic (or packets) originating at end-user wireless devices 104A, 104B, 104C and/or at iRelay node 110A over (or through) one or more of the over-the-air backhaul links 134A, 134B, 134C established with DeNBs 112A, 114A, 116A to improve (or safeguard) user data rate, spectral efficiencies, etc., for end-user wireless devices 104A, 104B, 104C.

At 202, iRelay node 110A may identify DeNBs 112A, 114A, 116A within a radio range 160 of iRelay node 110A. For example, system 100 via wireless network 122, DeNB 112A, and/or iRelay node 110A can enable (or turn on) iAntenna 168 at iRelay node 110A such that iRelay node 110A operates in iMode. In iMode, iRelay node 110A can steer iAntenna 168 to scan and attach (e.g., via an RRC Connection) to DeNBs 112A, 114A, 116A with a broadcast signal condition (or level) that meets a criteria (or falls within a set signal range). For example, for DeNBs 112A, 114A, 116A whose broadcast signal condition meets the criteria, iRelay node 110A can simultaneously (or otherwise) establish (or setup) RRC Connections with those DeNBs 112A, 114A, 116A, which DeNBs 112A, 114A, 116A form a pool of candidate DeNBs 112A, 114A, 116A.

The criteria for the broadcast signal conditions of candidate DeNBs 112A, 114A, 116A can include a preference or requirement for DeNBs 112A, 114A, 116A such as a minimum available throughput (e.g., based on a number of end-user wireless devices 104A, 104B, 104C that are attaching to or expected to be attached to iRelay node 110A and/or candidate DeNBs 112A, 114A, 116A), a frequency band, a CA ability, Beamforming ability, MIMO ability, CoMP ability, etc. The criteria for the broadcast signal level of candidate DeNBs 112A, 114A, 116A can include a signal strength, a signal quality, and/or other signal level measurement. A signal strength can include SNR, SIR, an SINR, a CINR, a RSSI, a RSRP, and the like. A signal quality can include a CQI, RSRQ, and the like.

In an exemplary embodiment, iRelay node 110A (operating in iMode) can use iAntenna 168 to detect (or compare) RSRP and/or RSRQ broadcast signals (or levels) from DeNBs 112A, 114A, 116A within (or to) a set range of acceptable RSRP and/or RSRQ broadcast signal level values; iRelay node 110A can simultaneously (or otherwise) establish an RRC Connection with DeNBs 112A, 114A, 116A having RSRP and/or RSRQ broadcast signal levels within the set range. The RSRP and/or RSRQ broadcast signal levels of DeNBs 112A, 114A, 116A can be used to calculate a new $RS_n$, the new reference signal $RS_n$ being assigned to specific REs allocated for iRelay node 110A. As noted above, iRelay node 110A can use the RRC Connection to collect data (e.g., reported CQI, MCS, etc.) from DeNBs 112A, 114A, 116A at iTx/Rx antennas 170, which may be configured as smart antennas. The collected data (e.g., reported CQI, MCS, etc.) is used to determine (or calculate) an expected throughput for over-the-air backhaul links 134A, 134B, 134C. Based on the expected throughput, iRelay node 110A can estimate a number (or other quantity) of PRBs available at each DeNB 112A, 114A, 116A for dedication (or allocation) as backhaul PRBs to iRelay node 110A, which is used to calculate a metric f for each DeNB 112A, 114A, 116A in the pool of candidate DeNBs 112A, 114A, 116A.

At 204, iRelay node 110A may prioritize the pool of candidate DeNBs 112A, 114A, 116A based on the calculated metric f. For example, the calculated metric f can be either a ratio of RSRP to AveragePRB and/or a ratio of $RS_n$ to AveragePRB, where AveragePRB is available PRBs for iRelay node 110A backhaul at DeNBs 112, 114, and/or 116. iRelay node 110A may select (or prefer) DeNBs 112A, 116A over 114A based on the calculated metric f. In one embodiment, the RSRP to AveragePRB and/or the $RS_n$ to AveragePRB ratio for DeNB 112A can be −90/50%, where AveragePRB is available PRBs for iRelay node 110A backhaul at DeNB 112A. Similarly, the RSRP to AveragePRB and/or the $RS_n$ to AveragePRB ratio for DeNB 114A can be −90/10%, where AveragePRB is available PRBs for iRelay node 110A backhaul at DeNB 114A. Finally, the RSRP to AveragePRB and/or the $RS_n$ to AveragePRB ratio for DeNB 116A can be −90/30%, where AveragePRB is available PRBs for iRelay node 110A backhaul at DeNB 116A. Because −90/50% is greater than both −90/10% and −90/30%, iRelay node 110A may prioritize (or prefer) DeNB 112A over both DeNBs 114A and 116A for establishing a data session (e.g., using iTx/Rx antenna 170, iAntenna 168, and/or over-the-air backhaul link 134A). Alternatively or in addition, iRelay node 110A may create a prioritized look-up list of DeNBs 112A, 114A, 116A and rank the DeNBs 112A, 114A, 116A from highest-prioritized to lowest-prioritized (e.g., DeNB 112A, DeNB 116A, DeNB 114A) and store the prioritized look-up list at iRelay node 110A and/or at some other network element.

PRB utilization for DeNBs 112A, 114A, 116A and/or allocation (or dedication) of PRBs for iRelay node 110A backhaul at DeNBs 112A, 114A, 116A can also be static (e.g., a fixed percentage of total PBRs at DeNBs 112A, 114A, 116A may be allocated (or designated) as backhaul PRBs for iRelay node 110A and exchanged between DeNBs 112A, 114A, 116A and iRelay node 110A during a link setup, i.e., after the RACH process) or dynamic (e.g., variable percentage information of total PRBs at DeNBs 112A, 114A, 116A can be exchanged between DeNBs 112A, 114A, 116A and iRelay node 110A).

At 206, iRelay node 110A may establish a data session (e.g., using iTx/Rx antenna 170, iAntenna 168, and/or over-the-air backhaul link 134A) between iRelay node 110A and the highest-prioritized DeNB 112A. iRelay node 110A can send and/or receive data packets to/from end-user wireless devices 104A, 104B, 104C using Tx/Rx antennas 176 deployed at the iRelay node 110A. The Tx/Rx antennas 176 are (or can be) configured as smart antennas. Because iRelay node 110A includes greater computational and/or RF capabilities than relay nodes 108, 110 and/or end-user wireless devices 104A, 104B, 104C, iRelay node 110A can sustain and use the established over-the-air backhaul link (or direct backhaul link) 134A to DeNB 112A as backhaul for end-user wireless devices 104A, 104B, 104C by tunneling data traffic (or packets) originating at end-user wireless devices 104A, 104B, 104C over (or through) over-the-air backhaul link 134A on the UL using, for example, a GTP. iRelay node 110A may change the highest-prioritized DeNBs 112A, 114A, 116A to different DeNBs 112A, 114A, 116A dynamically or periodically.

At 208, DeNBs 112A, 114A, 116A may be re-prioritized dynamically and/or periodically. For example, iRelay node 110A can initiate a set timer at iRelay node 110A that is configured to run for a predetermined period of time (or value). The predetermined period of time (or value) can be specific to: (i) load information and/or throughput associated with DeNBs 112A, 114A, 116A and/or iRelay node 110A; (ii) a time of day, averaged over a plurality of days; (iii) period of time (e.g., milliseconds, seconds, minutes, hour of interest, day, month, etc.); (iv) signal conditions at DeNBs 112A, 114A, 116A and/or iRelay node 110A, etc. When the set timer expires, iRelay node 110A repeats steps 202-206 for DeNB 112A, 114A, 116A selection. Alternatively, event triggers may be defined for iRelay node 110A. For example, the event trigger can be a calculated new $RS_n$ and/or RSRP value for DeNBs 112A, 114A, 116A that is less than a threshold $RS_n$ value and/or a threshold RSRP value or a ratio (or percentage) of PRBs available for iRelay node 110A backhaul at DeNBs 112A, 114A, 116A, which would result in a throughput to iRelay node 110A and/or end-user wireless devices 104A, 104B, 104C that is less than a threshold throughput. When the defined event(s) are triggered, iRelay node 110A repeats steps 202-206 for DeNB 112A, 114A, 116A selection.

Figure 3:
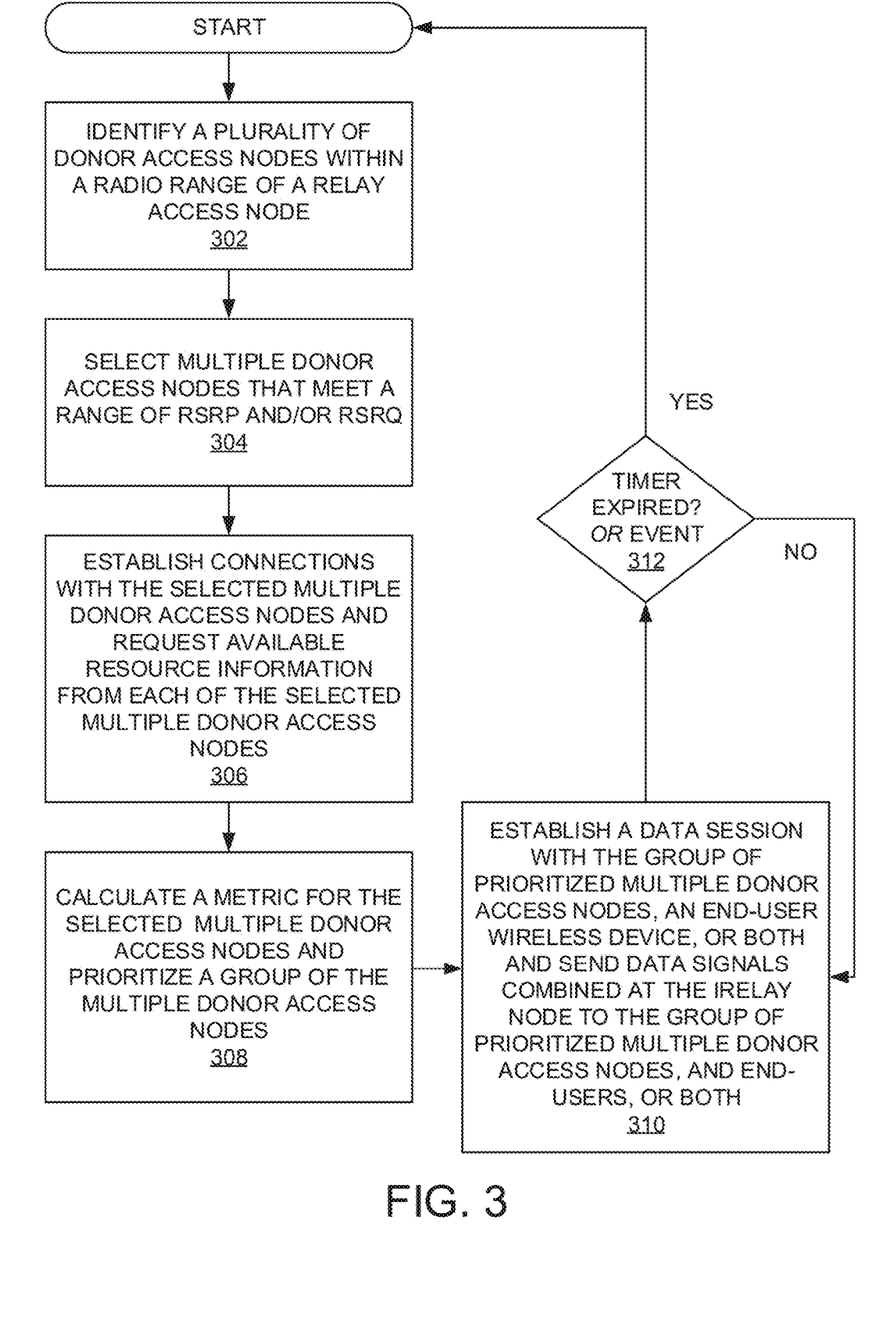
FIG. 3 illustrates another flow chart of an exemplary method for DeNB selection.

FIG. 3 illustrates another flow chart of an exemplary method for DeNB selection. The method will be discussed with reference to the exemplary system 100 illustrated in FIG. 1A and the exemplary iRelay AN illustrated in FIG. 1B. But, the method for DeNB selection illustrated in FIG. 3 can be implemented with any suitable communication system. In addition, although FIG. 3 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

At Steps 302 and 304, iRelay node 110A may identify DeNBs 112A, 114A, 116A within a radio range 160 of iRelay node 110A. For example, system 100 via wireless network 122, DeNBs 112A, 114A, 116A, and/or iRelay node 110A can enable (or turn on) iAntenna 168 at iRelay node 110A such that iRelay node 110A operates in iMode. In iMode, iRelay node 110A can steer iAntenna 168 to scan and attach (e.g., via an RRC Connection) to DeNBs 112A, 114A, 116A within a radio range 160 of iRelay node 110A having a broadcast signal condition (or level) that meets a criteria (or falls within a set signal range). For example, iRelay node 110A can simultaneously (or otherwise) establish (or setup) RRC Connections with DeNBs 112A, 114A, 116A whose broadcast signal condition (or level) meets the criteria, which DeNBs 112A, 114A, 116A form a pool of candidate DeNBs 112A, 114A, 116A.

The criteria for the broadcast signal conditions of the pool of candidate DeNBs 112A, 114A, 116A can include a preference or requirement for DeNBs 112A, 114A, 116A such as a minimum available throughput (e.g., based on a number of end-user wireless devices 104A, 104B, 104C that are attaching to or expected to be attached to iRelay node 110A and/or candidate DeNBs 112A, 114A, 116A), a frequency band, a CA ability, Beamforming ability, MIMO ability, CoMP ability, etc. The criteria for the broadcast signal level of the pool of candidate DeNBs 112A, 114A, 116A can include a signal strength, a signal quality, and/or other signal level measurement. A signal strength can include SNR, SIR, an SINR, a CINR, a RSSI, a RSRP, and the like. A signal quality can include a CQI, RSRQ, and the like.

In an exemplary embodiment, iRelay node 110A (operating in iMode) can use iAntenna 168 to detect (or compare) RSRP and/or RSRQ broadcast signals (or levels) from the pool of candidate DeNBs 112A, 114A, 116A within (or to) a set range of acceptable RSRP and/or RSRQ broadcast signal level values; iRelay node 110A can simultaneously (or otherwise) establish an RRC Connection with DeNBs 112A, 114A, 116A from the pool of candidate DeNBs 112A, 114A, 116A having RSRP and/or RSRQ broadcast signal levels within the set range. The RSRP and/or RSRQ broadcast signal levels of the pool of candidate DeNBs 112A, 114A, 116A can be used to calculate a new $RS_n$, the new reference signal $RS_n$ being assigned to specific REs allocated for iRelay node 110A. That is, iRelay node 110A uses the reported RSRP and/or RSRQ broadcast signal levels from DeNBs 112A, 114A, 116A and/or the calculated new $RS_n$ to select DeNBs 112A, 114A, 116A from the pool of candidate DeNBs 112A, 114A, 116A to establish RRC Connections with.

At Step 306, after the RRC Connections are established with the selected candidate DeNBs 112A, 114A, 116A at Step 304, iRelay node 110A can collect data (e.g., reported CQI, MCS, etc.) from the candidate DeNBs 112A, 114A, 116A using iTx/Rx antennas 170, which may be configured as smart antennas. The collected data (e.g., reported CQI, MCS, etc.) is used to determine (or calculate) an expected throughput for over-the-air backhaul links 134A, 134B, 134C of DeNBs 112A, 114A, 116A. Based on the expected throughputs, iRelay node 110A can estimate a number (or other quantity) of PRBs available at each of the candidate DeNBs 112A, 114A, 116A for dedication (or allocation) as backhaul PRBs to iRelay node 110A, which estimation is used to calculate a metric f for each candidate DeNB 112A, 114A, 116A selected from the pool of candidate DeNBs 112A, 114A, 116A.

At Step 308, iRelay node 110A can calculate a metric f for each candidate DeNB 112A, 114A, 116A and use the calculated metric f to select multiple, preferred DeNBs 112A, 116A from the candidate DeNBs 112A, 114A, 116A. For example, iRelay node 110A may calculate an AveragePRB for PRBs available for dedication (or allocation) as backhaul PRBs to iRelay node 110A from DeNBs 112A, 114A, and 116A, where the AveragePRB is the average of AveragePRBs across each of the candidate DeNBs 112A, 114A, 116A (e.g., for 112A the average available PRBs is 50 PRBs; for 114A the average available PRBs is 25 PRBs; and for 116A the average available PRBs is 30 PRBs; thus, the average is (50 PRBs+25 PRBs+30 PRBs)/3=35 PRBs). Alternatively, PRB utilization for DeNBs 112A, 114A, 116A and/or allocation (or dedication) of PRBs for iRelay node 110A backhaul at DeNBs 112A, 114A, 116A can be static (e.g., a fixed percentage of total PBRs at DeNBs 112A, 114A, 116A may be allocated (or designated) as backhaul PRBs for iRelay node 110A and exchanged between DeNBs 112A, 114A, 116A and iRelay node 110A during a link setup, i.e., after the RACH process) or dynamic (e.g., variable percentage information of total PRBs at DeNBs 112A, 114A, 116A can be exchanged between DeNBs 112A, 114A, 116A and iRelay node 110A). The calculated metric f can be either a ratio of RSRP to AveragePRB and/or a ratio of $RS_n$ to AveragePRB. iRelay node 110A may select (or prefer) multiple, candidate DeNBs 112A, 116A over other DeNBs 114A based on the calculated metric f. For example, in one embodiment, the RSRP to AveragePRB and/or $RS_n$ to AveragePRB for DeNBs 112A and 116A can be −90/50%, where AveragePRB is a sum of available PRBs for iRelay node 110A backhaul across DeNBs 112A and 116A. Similarly, the RSRP to AveragePRB and/or $RS_n$ to AveragePRB for DeNBs 112A and 114A can be −90/30%, where AveragePRB is a sum of available PRBs for iRelay node 110A backhaul across DeNBs 112A and 114A. Because −90/50% is greater than −90/30%, iRelay node 110A may select (or prefer) DeNBs 112A and 116A over a combination of DeNBs that includes DeNB 114A for establishing a data session (e.g., using iTx/Rx antenna 170, iAntenna 168, and/or over-the-air backhaul links 134A, 134C).

At Step 310, iRelay node 110A may establish a data session (e.g., using iTx/Rx antenna 170, iAntenna 168, and/or over-the-air backhaul links 134A, 134C) between iRelay node 110A and preferred DeNBs 112A and 116A. iRelay node 110A can send and/or receive data packets to/from end-user wireless devices 104A, 104B, 104C using Tx/Rx antennas 176 deployed at iRelay node 110A. The Tx/Rx antennas 176 are (or can be) configured as smart antennas. Because iRelay node 110A includes greater computational and/or RF capabilities than relay nodes 108, 110 and/or end-user wireless devices 104A, 104B, 104C, iRelay node 110A can sustain and use the established over-the-air backhaul links 134A, 134C to DeNBs 112A, 116A as backhaul for end-user wireless devices 104A, 104B, 104C by tunneling data traffic (or packets) originating at end-user wireless devices 104A, 104B, 104C over (or through) over-the-air backhaul links 134A, 134C on the UL using, for example, a GTP. In addition, due to the number of iTx/Rx antennas 168 and/or Tx/Rx antennas 178 deployed at iRelay node 110A, iRelay node 110A may combine UL and/or DL signals together at iRelay node 110A for coordinated transmission to and/or reception from DeNBs 112A, 116A and/or end-user wireless devices 104A, 104B, 104C. More specifically, in one embodiment, on the UL, iRelay node 110A can transmit (or tunnel) data traffic (or packets) originating at end-user wireless devices 104A, 104B, 104C and/or at iRelay node 110A through the multiple, over-the-air backhaul links 134A, 134C to the multiple, candidate DeNBs 112A, 116A, and instruct one or more of the candidate DeNBs 112A, 116A (e.g., a "lead" DeNB) to "combine" the data packets (e.g., UL CoMP using joint reception) to improve throughput for end-user wireless devices 104A, 104B, 104C by increasing the available backhaul. The "lead" DeNB can be, for example, the initial DeNB that iRelay node 110A attaches to.

At Step 312, DeNBs 112A, 116A may be re-prioritized dynamically and/or periodically. For example, iRelay node 110A can initiate a set timer at iRelay node 110A that is configured to run for a predetermined period of time (or value). The predetermined period of time (or value) can be specific to: (i) load information and/or throughput associated with DeNBs 112A, 114A, 116A and/or iRelay node 110A; (ii) a time of day, averaged over a plurality of days; (iii) period of time (e.g., milliseconds, seconds, minutes, hour of interest, day, month, etc.); (iv) signal conditions at DeNBs 112A, 114A, 116A and/or iRelay node 110A, etc. When the set timer expires, iRelay node 110A repeats steps 302-310 for DeNB 112A, 114A, 116A selection. Alternatively, event triggers may be defined for iRelay node 110A. For example, the event trigger can be a calculated new $RS_n$ and/or RSRP value for DeNBs 112A, 116A that is less than a threshold $RS_n$ value and/or a threshold RSRP value or a ratio (or percentage) of PRBs available for iRelay node 110A backhaul at DeNBs 112A, 116A, which would result in a throughput to iRelay node 110A and/or end-user wireless devices 104A, 104B, 104C that is less than a threshold throughput. When the defined event(s) are triggered, iRelay node 110A repeats steps 302-310 for DeNB 112A, 114A, 116A selection.

Figure 4:
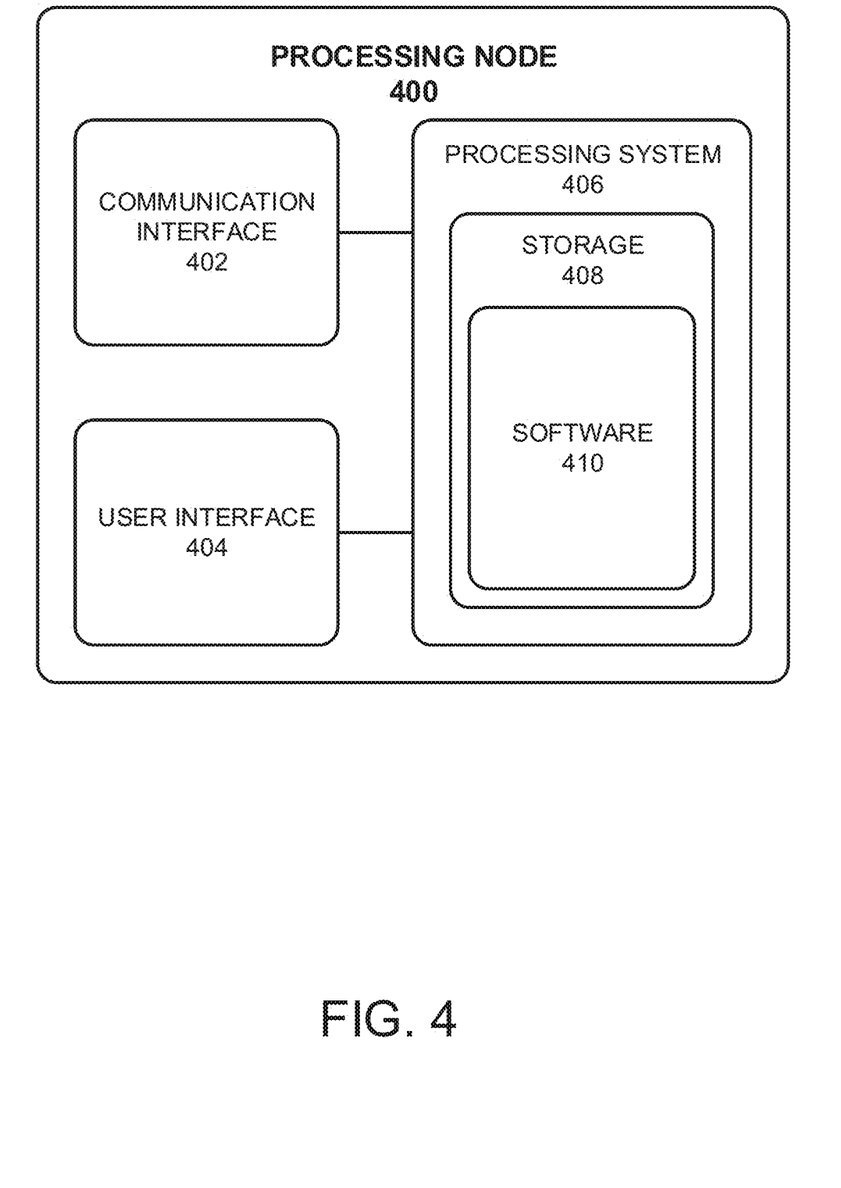
FIG. 4 illustrates an exemplary processing node.

FIG. 4 illustrates an exemplary processing node 400 in a communication system. Processing node 400 comprises communication interface 402, user interface 404, and processing system 406 in communication with communication interface 402 and user interface 404. Processing node 400 can be configured to determine a communication access node for a wireless device. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. Software 410 may include computer programs, firmware, or some other form of machine-readable instructions, including an operating system, utilities, drivers, network interfaces, applications, or some other type of software. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

Examples of processing node 400 include iRelay nodes 108, 110, 110A, DeNBs 112, 112A, 114, 114A, 116, 116A, gateway node 118, and controller node 120, and inspection module and/or node (not shown). Processing node 400 can also be an adjunct or component of a network element, such as an element of iRelay nodes 108, 110, 110A, DeNBs 112, 112A, 114, 114A, 116, 116A, gateway node 118, and controller node 120, and inspection module and/or node (not shown). Processing node 400 can also be another network element in a communication system. Further, the functionality of processing node 400 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for donor selection at a relay access node, comprising:
   identifying a plurality of candidate donor access nodes with Reference-Signal-Received-Power (RSRP) values and Reference-Signal-Reference-Quality (RSRQ) values within a set range of RSRP and RSRQ values, the plurality of candidate donor access nodes comprising a plurality of over-the-air backhaul links, wherein the relay access node is within a radio range of each of the plurality of candidate donor access nodes, the relay access node comprising a directional antennae array used to identify the plurality of candidate donor access nodes;
   collecting data from the plurality of candidate donor access nodes to determine an expected throughput of the plurality of over-the-air backhaul links;
   estimating a number of physical resource blocks (PRBs) available at each candidate donor access node for dedication as backhaul PRBs to the relay access node;
   prioritizing each of the candidate donor access nodes using a calculated metric based on (i) the RSRP or a new Reference Signal ($RS_n$) based on the RSRP and RSRQ values of the plurality of candidate donor access nodes, and (ii) the estimated number of PRBs, to determine a highest-prioritized donor access node;
   steering the directional antennae array in the direction of the highest-prioritized donor access node; and
   establishing a data session between the relay node and the highest-prioritized donor access node.

2. The method of claim 1, further comprising:
   establishing, at the relay access node, an over-the-air backhaul link with the highest-prioritized donor access node, wherein the over-the-air backhaul link is configured based on a network resource usage strategy.

3. The method of claim 1, wherein the relay node is beam-formed.

4. The method of claim 1, further comprising:
   tunneling, by the relay node, data traffic originating at one or more end-user wireless devices through at least one over-the-air backhaul link established with the highest-prioritized donor access node on the UL using a tunneling protocol.

5. The method of claim 1, wherein the relay node is self-backhauling.

6. The method of claim 1, wherein the steering comprises using a sounding channel.

7. The method of claim 1, further comprising calculating the $RS_n$, wherein the estimated number of PRBs is an average number of PRBs at a candidate donor access node and the calculated metric is a ratio of $RS_n$ to the average number of PRBs at the candidate donor access node.

8. The method of claim 1, wherein the estimated number of PRBs is an average number of PRBs at a candidate donor access node and the calculated metric is a ratio of the RSRP value to the average number of PRBs at the candidate donor access node.

9. The method of claim 1, wherein the data is collected using a Radio Resource Control (RRC).

10. A method for donor selection at a relay access node, comprising:
    prioritizing, at a stationary relay node, multiple donor access nodes whose Reference-Signal-Received-Power (RSRP) values and Reference-Signal-Reference-Quality (RSRQ) values are within a set range of RSRP and RSRQ values, the relay access node comprising a directional antennae array;
    collecting, at the relay node, data from the plurality of candidate donor access nodes to determine an expected throughput of the plurality of over-the-air backhaul links;
    estimating, at the relay node, a number of physical resource blocks (PRBs) available at each candidate donor access node for dedication as backhaul PRBs to the relay access node;
    calculating, at the relay node, a metric for the prioritized access nodes based on (i) the RSRP or a new Reference Signal ($RS_n$) based on the RSRP and RSRQ values of the multiple donor access nodes, and (ii) the estimated number of PRBs;

establishing, at the relay node, data sessions with each of the prioritized access nodes using the directional antennae array; and sending data to wireless devices, the prioritized access nodes, or both via the relay node using coordinated multipoint (CoMP) via the directional antennae array.

11. The method of claim 10, further comprising:

establishing an over-the-air backhaul link between the relay node and each of the prioritized access nodes, wherein the data packets are sent to the prioritized access nodes using the over-the-air backhaul links.

12. The method of claim 10, further comprising calculating the $RS_n$, wherein the estimated number of PRBs is an average number of PRBs across all of the prioritized access nodes, and the calculated metric is a ratio of $RS_n$ to the average number of PRBs.

13. The method of claim 10, wherein the estimated number of PRBs is an average number of PRBs across all the prioritized access nodes, and the calculated metric is a ratio of RSRP to the average number of PRBs.

14. The method of claim 10, wherein the data is collected using a Radio Resource Control (RRC).

15. The method of claim 10, wherein the sending comprises combining uplink signals, downlink signals, or both.

16. A system for donor selection at a relay access node, comprising:

a processing node configured to:

prioritize, at a stationary relay node, multiple donor access nodes whose Reference-Signal-Received-Power (RSRP) values and Reference-Signal-Reference-Quality (RSRQ) values are within a set range of RSRP and RSRQ values, the relay access node comprising a directional antennae array;

collect, at the relay node, data from the plurality of candidate donor access nodes to determine an expected throughput of the plurality of over-the-air backhaul links;

estimate, at the relay node, a number of physical resource blocks (PRBs) available at each candidate donor access node for dedication as backhaul PRBs to the relay access node;

calculate, at the relay node, a metric for the prioritized access nodes based on (i) the RSRP or a new Reference Signal ($RS_n$) based on the RSRP and RSRQ values of the multiple donor access nodes, and (ii) the estimated number of PRBs;

establish, at the relay node, data sessions with each of the prioritized access nodes using the directional antennae array; and send data to wireless devices, the prioritized access nodes, or both via the relay node using coordinated multipoint (CoMP) via the directional antennae array.

17. The system of claim 16, wherein the processing node is further configured to:

establish an over-the-air backhaul link between the relay node and each of the prioritized access nodes, wherein the data packets are sent to the prioritized access nodes using the over-the-air backhaul links.

18. The system of claim 16, wherein the processor is further configured to calculate the $RS_n$, the estimated number of PRBs is an average number of PRBs across all the prioritized access nodes, and the calculated metric is a ratio of $RS_n$ to the average number of PRBs.

19. The system of claim 16, wherein the estimated number of PRBs is an average number of PRBs across all the prioritized access nodes, and the calculated metric is a ratio of RSRP to the average number of PRBs.

20. The system of claim 16, wherein the sending comprises combining uplink signals, downlink signals, or both.

* * * * *